United States Patent [19]

Levy et al.

[11] 4,143,971
[45] Mar. 13, 1979

[54] RECONNAISSANCE/SURVEILLANCE SYSTEM UTILIZING COLOR SIGNATURE OF TARGET

[75] Inventors: Marilyn Levy, Little Silver; Vincent W. Ball, Interlaken, both of N.J.

[73] Assignee: The United States of America as represented by the Secretary of the Army, Washington, D.C.

[21] Appl. No.: 826,295

[22] Filed: Aug. 22, 1977

[51] Int. Cl.$^2$ ................................................ G01T 3/46
[52] U.S. Cl. ...................................... 356/404; 356/418
[58] Field of Search ................. 356/173, 175, 188, 28; 250/226, 215, 214 P, 321, 323, 327, 330, 363 R, 363 S, 233, 578, 236, 83; 95/73; 96/2; 358/175, 199; 25/330; 346/29, 33; 350/311

[56] References Cited

U.S. PATENT DOCUMENTS

| Re. 28,771 | 4/1976 | Aimi et al. | 356/175 |
|---|---|---|---|
| 2,369,317 | 2/1945 | Shuricliff | 356/175 |
| 2,728,265 | 12/1955 | Stimson et al. | 356/175 |
| 3,027,801 | 4/1962 | Simmon | 356/175 |
| 3,679,314 | 7/1972 | Mustert | 356/71 |
| 3,783,284 | 1/1974 | McCormack | 356/51 |
| 4,023,040 | 5/1977 | Weber | 250/226 |
| 4,061,428 | 12/1977 | Amano et al. | 250/226 |
| 4,076,979 | 2/1978 | Walter et al. | 250/226 |
| 4,078,997 | 3/1978 | Bienko et al. | 250/226 |

FOREIGN PATENT DOCUMENTS 696246  8/1953  United Kingdom ..................... 356/173

*Primary Examiner*—John K. Corbin
*Assistant Examiner*—B. W. de los Reyes
*Attorney, Agent, or Firm*—Nathan Edelberg; Sheldon Kanars; Bernard Franz

[57] ABSTRACT

A photo-reconnaissance/surveillance system in which the landscape to be scanned is photographed on color film. The film is then developed in a highspeed processor and scanned by photosensors. Illuminations for the sensors is provided by a plurality of point sources of light. Colored filters e.g., a green filter and a blue filter, are alternately interposed between the light sources and the film. A logic circuit compares the transmission through the film for both light conditions and, thus, can detect the presence of a target, if the color signature of the target is known a priori.

13 Claims, 2 Drawing Figures

RECONNAISSANCE/SURVEILLANCE SYSTEM UTILIZING COLOR SIGNATURE OF TARGET

GOVERNMENT LICENSE

The invention described herein may be manufactured and used by or for the Government for governmental purposes without the payment of any royalties thereon or therefor.

BACKGROUND OF THE INVENTION (a) Field of the Invention

Broadly speaking, this invention relates to photo-reconnaissance and surveillance. More particularly, in a preferred embodiment, this invention relates to a photo-reconnaissance and surveillance system which utilizes color signature information to identify specified targets.

(b) Discussion of the Prior Art

One of the disadvantages to the use of photography in intelligence work is the slowness of the information gathering process. For example, in a typical photo-reconnaissance mission the flight is made; the aircraft returns to its base; the film is processed, then scanned by an interpreter who determines if any potential targets are present; the targets, if found, are geographically located, then the information relayed to the Field Commander for action. By the time that this process is completed the theatre of operation may have moved to an entirely different area and the intelligence, thus, becomes useless. Radar, infra-red, and laser sensors have all been proposed as substitutes for photography because these sensors have the ability to provide real-time access to intelligence information. None of these sensors, however, can really compete with photography which is an instant storage medium capable of providing intelligence with extremely fine resolution.

SUMMARY OF THE INVENTION

As a solution to this and other problems, the instant invention discloses methods and apparatus for utilizing photographic information as a target-detecting device in such a manner that the information can be relayed to the Field Commander in near-real time.

More specifically, the invention disclosed and claimed herein analyzes potential targets in terms of their color signature. As is well known, much work has been done in the past to correlate potential targets on a monochrome photographic surveillance film in terms of the size and shape of the target, but it soon becomes evident to even the uninitiated that the scale, angle of view, size and resolution of the target images all interfere with such an analysis.

As an example, let us assume that we have photographed red, blue and green compact station wagons and a military jeep on monochrome film. If, as will generally be the case, the details on the vehicles are not visible, it is more than likely that all four vehicles will be photographed as grey rectangles of similar size and shape with the only distinguishing factor being a slight variation in the tone of grey. However, if the vehicles were photographed with color film, either reversal or negative, one could immediately discern the differences between the cars because each target would have a unique color signature. This signature can be distinguished by the human eye (assuming the observer is not color blind) but it may also readily be distinguished by the use of a photo-receptor (e.g. a photocell or photo-transistor) that can measure the absorption of the exposed film to red, blue or green light.

If then, the target images on the film are scanned with a red, green or blue light source which is smaller than the smallest target image on the film, a change in the response of the photoreceptor will be immediately detected and this change can be related to a particular color. If, for example, we are only interested in detecting the jeep as a target, we can adjust the electronic detector to respond only when the receptor has sensed the color signature of the jeep.

In a preferred embodiment, the invention comprises apparatus for detecting a target of known color signature. The apparatus comprises color sensitive means for viewing a scene suspected of containing said target and for producing an electrical output signal representative thereof and means responsive to the output signal for examining successive regions of the scene to determine the ratio between at least two specified color components thereof, thereby to ascertain the presence of said target.

The invention and its mode of operation will be more fully understood from the following detailed description, when taken with the appended drawings in which:

DETAILED DESCRIPTION OF THE INVENTION

Figure 1:
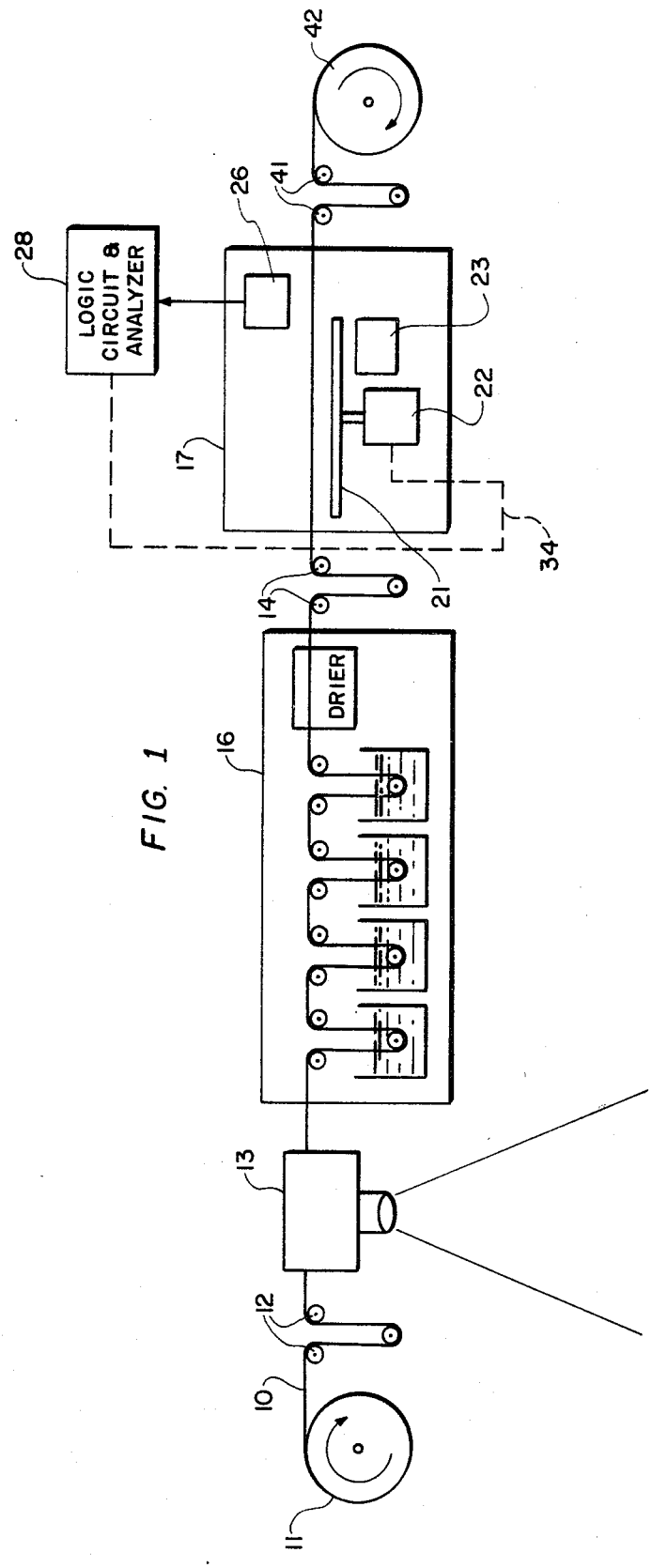
FIG. 1 is a partially schematic, partially diagrammatic drawing of a first illustrative embodiment of the invention.

In the process to be described below, color negative film is used in-flight to photograph an area of interest. The film is then processed using any of several known rapid color processing techniques. When the film exits from the last stage of the processor, it is passed between a bank of light sources and a corresponding bank of photoreceptors. A two-color filter moves rapidly in the path of light beams emitted from the light sources so that the photoreceptors can measure the light transmitted by the film for each filter. The signature of the targets of interest can then be related to the response of the photocell to two of the primary colors, e.g., red and blue, or red and green, or blue and green, et cetera. More specifically, as shown in FIG. 1, color sensitive film 10 is fed from supply reel 11 through a pair of idler rollers 12—12 into a photo-reconnaissance camera 13. Thence, the film passes into a rapid processor 16 for development. The developed and dried film then passes through a second pair of idler rollers 14—14 into a scanner 17. As shown in greater detail in FIG. 2, scanner 17 comprises a rotating color wheel 21 driven by a motor 22. An illuminating source 23 which comprises a plurality of discrete light sources 24 illuminates film 10 through rotating filter 21. An analyzer 26, which comprises a plurality of discrete photocells or phototransistor 27, receives the light from illuminating source 23. The outputs from photocells 27 are connected to a logic circuit 28 for analysis.

Figure 2:
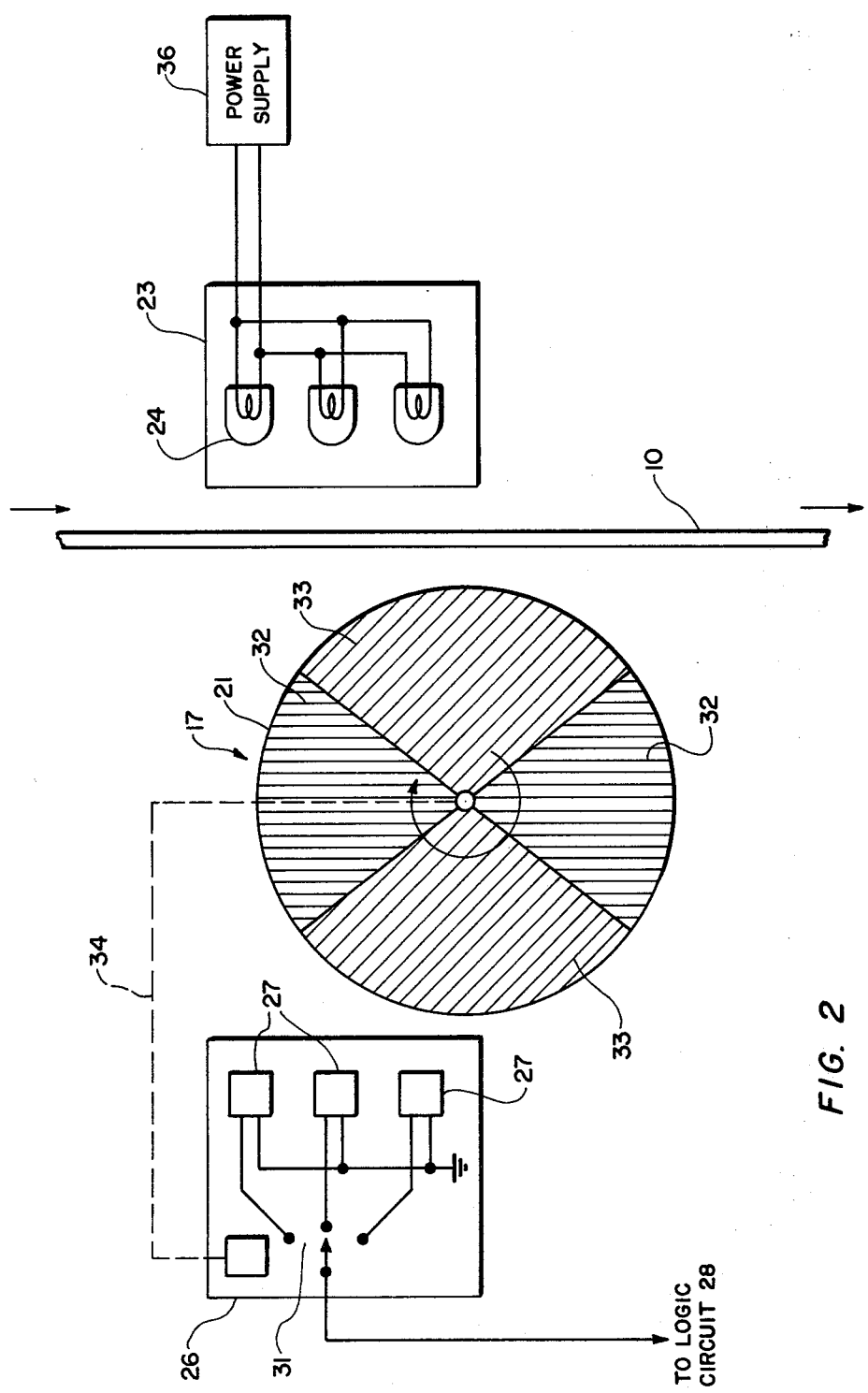
FIG. 2 is an isometric, partially schematic view, of a portion of the apparatus shown in FIG. 1.

To avoid clutter, FIG. 2 only shows three light sources 24 and three photocells 27. Obviously, a practical device would have many more such elements typically arranged in an $n_x$ m matrix. As shown, rotating filter 21 comprises two green filter segments 33 and two red filter segments 32. Again, a practical device might have more or less filter segments than those shown in FIG. 2 and other color combinations are also contemplated. The outputs of the photocells 27 are shown connected to logic circuit 28 via an electronic switch 31 which, thus, scans across the array.

Although not shown in the drawing, it is obviously necessary to synchronize this scanning with the rotation of filter wheel 21. This is diagrammatically shown by the line 34 which connects electronic switch 31 and the motor 22 for filter wheel 21. After the film leaves the scanner 17 it passes over a third set of idler rollers 41—41 thence to take-up spool 42.

It is self-evident from the above that by the appropriate choice of color filters, analyzer 26 can be programmed to respond to only certain colors. Thus, if the color signature of the target to be identified is known a priori, logic circuit 28 will only indicate that target and reject all others. Logic circuit 28 can also successfully detect a green target that is camouflaged with green foliage, for example. The reason for this is that the green foliage will have a slightly different color signature than the painted object. Further, striking color contrasts can be achieved by using infra-red sensitive, camouflage detection film rather than ordinary color film. As is well known, when this special film is used, natural deciduous foliage will photograph as red and painted objects will photograph blue.

The specific location of a target can easily be found from code information recorded on the frame by the use of fiducial marks, and/or by the location in the matrix of the photocell that gave the color signature response. A second station can then be provided that transmits a detailed photograph of the actual target that was pinpointed by the detector to the ground location. For example, the photographic image can be scanned and transmitted to ground using facsimile or slow scan TV techniques.

It should be understood that the instant invention is not limited to in-flight systems as it also has application in photo-interpretation ground stations where it can be used to rapidly scan surveillance or reconnaissance film which were priorly recorded. Yet another application of the invention is the use of the color signature of a target to identify a friend or foe in a battlefield situation. Friendly forces would arrange to utilize a specific color coding for their equipment, tarpaulins, et cetera that could be photographed with either conventional film or a photographic emulsion that has a spectral response especially designed to match the output of the color code.

Initial tests which were performed to prove the feasibility of the concept of photographic color signature were made by photographing a scene containing two military vehicles standing on a grass-covered area. One vehicle was painted dark green and the other olive drab. The density of the area of interest to red, green and blue light was read on a color densitometer and green-to-blue ratios determined. The color densities were as follows:

|  | Red | Green | Blue | Green/Blue |
|---|---|---|---|---|
| Dark Green Van | .80 | 1.46 | 1.57 | 66/77 |
| Olive Drab Van | .70 | 1.26 | 1.33 | 56/63 |
| Grass | .80 | 1.42 | 1.42 | 62/62 |

From the above, it will be seen that the green colors can be easily separated.

The above example presents the most difficult detection problem, i.e., the problem of distinguishing between several green objects. Any other color would immediately stand out in contrast.

One skilled in the art may make various changes and substitutions to the arrangement of parts shown without departing from the spirit and scope of the invention.

What I claim is:

1. Apparatus for detecting a target of known color signature and locating its position, which comprises:
    film-supply means to continuously supply a color-sensitive photographic film;
    a camera downstream of said film supply means to photograph onto said film successive portions of a scene suspected of containing said target;
    film processing means downstream of said camera to continuously process the exposed film using a rapid color processing technique;
    examining means downstream of said film processing means, comprising light source means, a bank of photoreceptors, and analyzing means, with said film passing between the light source means and the bank of photoreceptors; wherein the light source means includes spectral selection means to supply light of at least two different spectral contents, the photoreceptors are connected to supply electrical output signals to the analyzing means, the analyzing means uses said output signals for successive regions of the film to form detected color signatures thereof comprising the ratio of the output signals therefrom for light of at least two different specified color components thereof, and the analyzing means further compares said detected color signatues with stored data for said known color signature and provides a given indication in response to finding a match within predetermined limits.

2. The apparatus according to claim 1 wherein said film is color negative film.

3. The apparatus according to claim 1 wherein said film is color reversal film.

4. The apparatus according to claim 1 wherein said film is infra-red sensitive color film.

5. The apparatus according to claim 1, wherein said spectral selection means comprises means for alternately inserting filter elements of a first and a second color between light sources and said photoreceptors, and further includes means to synchronize and inserting means with the operation of the analyzing means.

6. Apparatus according to claim 1 for use in an aerospace vehicle which includes navigation equipment producing coded data identifying its location and other information, and wherein said camera includes means coupled to the navigation equipment to provide code marks on said color film corresponding to said coded data.

7. The apparatus according to claim 5 wherein said inserting means comprises:
    a rotatable disc having at least two segments of differing filter material; and
    means for rotating said filter disc in the path of said light sources.

8. A method of detecting a target of known color signature comprising continuous processing with color-sensitive film between a supply reel and a take-up reel including the steps of:
    photographing on said color film successive portions of a scene suspected of containing said target;

processing said color film;

alternately illuminating successive regions of said color film with light of at least two different wavelength bands, said light being received by a plurality of photoreceptors;

analyzing electric signals from said photoreceptors and computing color signatures comprising the ratio of light represented by the electric signals for at least two different specified color components for each region;

and comparing the color signatures with stored data for said known color signature and providing a given indication in response to a match within predetermined limits.

9. The method according to claim 8 wherein said illuminating step comprises:

directing a plurality of discrete light sources onto said film; and then positioning a rotating filter disc between said light sources and said film, said disc including at least two filter segments of differing filtration characteristics.

10. The method according to claim 8 including the further step of:

coloring the military vehicles, armament, et cetera, of friendly forces such that a predetermined color signature is obtained therefrom; and then in said color ratio computing step, ignoring targets having a color signature which corresponds to said predetermined color signature.

11. The method according to claim 8, including the further step of transmitting via electronic means to another location a copy of the photograph containing said region producing said given indication.

12. A method of detectng a target of known color signature, wherein successive portions of a scene suspected of containing said target have previously been photographed onto color-sensitive film, and the color film has been processed to provide color photographs of said scene, said method comprising the steps of:

alternately illuminating successive regions of said color film with light through two filters passing two different wavelength bands, said light being received by a plurality of photoreceptors;

analyzing electric signals from said photoreceptors and computing color signatures comprising the ratio of light represented by the electric signals for at least two different specified color components for each region;

and comparing the color signatures with stored data for said known color signatures and giving an indication in response to a match within predetermined limits.

13. The method according to claim 12, wherein said color photographs include code marks derived from navigation equipment and placed on the film when the scene was photographed, and the method includes the stop of using said code marks to identify the location of the target.

* * * * *